United States Patent [19]
Fletcher et al.

[11] 3,988,677
[45] Oct. 26, 1976

[54] SPACE COMMUNICATION SYSTEM FOR COMPRESSED DATA WITH A CONCATENATED REED-SOLOMON-VITERBI CODING CHANNEL

[76] Inventors: James C. Fletcher, Administrator of the National Aeronautics and Space Administration, with respect to an invention of Robert F. Rice, South Pasadena; Edward E. Hilbert, Tujunga, both of Calif.

[22] Filed: June 23, 1975

[21] Appl. No.: 589,173

[52] U.S. Cl. .................... 325/41; 340/146.1 AL; 340/146.1 AQ; 340/146.1 AV
[51] Int. Cl.$^2$ .................................... H04L 1/10
[58] Field of Search ............... 325/41, 4, 38 R; 358/13; 179/15 AE, 15 AP, 15.55 R, 15.55 T, 15 AC; 340/146.1 AL, 146.1 AQ, 146.1 AV

[56] References Cited
UNITED STATES PATENTS
3,831,143  8/1974  Trafton .................... 340/146.1 AV OTHER PUBLICATIONS
Hybrid Coding Systems Study—J. P. Odenwalder et al.—Linkabit Corp. Sept. 1972—NASA CR 114,486, Final Report.
"Practical Applications of Coding"—I. M. Jacobs, May 1974—IEEE Trans. on Info. Theory vol. IT-20, No. 3—pp. 305–310.
"Burst Correcting Codes for the Classic Bursty Channel"—G. David Forney, Jr. Oct. 1971—IEEE Trans. on Comm. Tech., vol. COM-19 No. 5, pp. 772–780.
"A Hybrid Coding Scheme for Discrete Memoryless Channels"—D. D. Falconer Mar. 1969 BSTJ pp. 691–702, 716–718.

*Primary Examiner*—Robert L. Griffin
*Assistant Examiner*—Marc E. Bookbinder
*Attorney, Agent, or Firm*—Monte F. Mott; Paul F. McCaul; John R. Manning

[57] ABSTRACT

A space communication system incorporating a concatenated Reed Solomon Viterbi coding channel is disclosed for transmitting compressed and uncompressed data from a spacecraft to a data processing center on Earth. Imaging (and other) data is first compressed into source blocks which are then coded by a Reed Solomon coder and interleaver with parameters J=8, E=16, I=16, followed by a convolutional encoder of parameters $k$=7, $v$=2. The received data is first decoded by a Viterbi decoder, followed by a Reed Solomon decoder and deinterleaver. The output of the latter is then decompressed, based on the compression criteria used in compressing the data in the spacecraft. The decompressed data is processed to reconstruct an approximation of the original data-producing condition or images.

10 Claims, 10 Drawing Figures

ORIGINAL PICTURE    RECONSTRUCTED PICTURE

3,988,677

SPACE COMMUNICATION SYSTEM FOR COMPRESSED DATA WITH A CONCATENATED REED-SOLOMON-VITERBI CODING CHANNEL

ORIGIN OF THE INVENTION

The invention described herein was made in the performance of work under a NASA contract and is subjected to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to a communication system and, more particularly, to an improved system for communicating compressed data from a spacecraft to Earth.

2. Description of the Prior Art

As is known by those familiar with the art of advanced space communication the information which is gathered in a spacecraft, generally referred to as data, is first coded to be transmitted to Earth, where it is received at one or more ground stations. The received coded data is first decoded and thereafter processed to retrieve the original data which is in the form of a stream of bits. The coding of the data in the spacecraft and the decoding of it after reception on the ground is generally referred to by the well known term "channel coding". As is appreciated, the basic motivation for channel coding has been to reduce the frequency of errors in the output information bit stream for a given signal to noise ratio, $E_b/N_o$, or conversely, to increase the transmission rate, $R_b$, at which information can be transmitted with a given error probability. For each channel coding technique the average bit error probability is generally plotted as a function of the signal to noise ratio (in db). These plots are generally referred to as the performance curves.

In the last few years many articles have appeared in various publications in which various channel coding techniques are analyzed and their relative merits highlighted. The following are but a few of prior art references:

A. A. J. Viterbi, "Convolutional Codes and their Performance in Communication Systems", IEEE Trans. Commun. Technol., Volume COM-19, and part II, October 1971, pp. 751–772.

B. J. A. Heller and I. M. Jacobs, "Viterbi Decoding for Satellite and Space Communication", IEEE Trans. Commun. Technol., Vol COM-19, part II, October 1971, pp. 835–848.

C. J. P. Odenwalder et al., "Hybrid Coding Systems Study", Final Report prepared by Linkabit Corporation for Ames Research Center NASA, September 1972. This report is available to the public as NASA Cr 114,486.

Reference A is an excellent tutorial on a decoder, now generally referred to as the Viterbi decoder for use with a convolutional coder and a modulator and transmitter in the spacecraft and a receiver and demodulator on the ground, hereinafter generally referred to as the Viterbi channel. Extensive performance characteristics of the Viterbi channel for different constraint lengths, represented by K, and different code rates, represented by $1/\nu$, are analyzed and plotted in reference B. Most of the curves in reference B are plotted under assumed ideal operating conditions in which the carrier phase tracking loop signal-to-noise ratio, represented by $\alpha$, is assumed to be infinity. In FIG. 15 on page 845 of reference B the performance of the Viterbi channel for $K=7$ and $\nu=2$, i.e., a code rate of ½ for various values of $\alpha$ is plotted in terms of bit error rate vs $E_b/N_o$ (in db). As seen therefrom for any desired bit error rate the required system's $E_b/N_o$ increases (transmission rate drops) as a$\alpha$ becomes smaller.

Reference C is related to a hybrid coding system which is analyzed. The hybrid system, as shown on page 10 of reference C, includes a Reed-Solomon (RS) encoder which encodes data gathered at a remote location, e.g., a spacecraft, into RS codewords, each consisting of code symbols and parity symbols. These codewords are first interleaved by means of a buffer prior to being encoded by a convolutional encoder in the spacecraft. The received coded data on the ground is first decoded by a Viterbi decoder whose output is loaded into a deinterleaving buffer to reconstruct the RS codewords, which are then decoded by a RS decoder. The output of the latter is the fully decoded data which is then processed. Since the convolutional encoder and the Viterbi decoder along with the modulation and demodulation system have been defined herein as a Viterbi channel, the system described in reference C can be defined as a concatenated RS-Viterbi channel, or system. Hereinafter it may also be referred to by the simpler term, "the concatenated system".

Although in reference C the advantages of the concatenated RS-Viterbi channel over other known channels are discussed, it should be stressed that in reference C the performance of the concatenated RS-Viterbi channel are analyzed only under assumed ideal conditions, i.e., $\alpha = \infty$. Performance under non-ideal conditions are neither discussed nor suggested. Also, none of the above mentioned references consider the channel from a system's point of view, including the type of data which is to be communicated.

As is appreciated by those familiar with the art of information communications, it is generally desirable to reduce the number of bits which represent any information, e.g., a picture of a planet, and which have to be transmitted without significantly sacrificing information content. This is desirable, since by reducing the number of bits, more information can be transmitted to Earth during any given period of time. This can be achieved if the original data, gathered in the spacecraft, can be compressed to reduce the number of bits needed to communicate the information before any coding is performed. As is appreciated various compression techniques may be employed. Then, after the data is decoded on the ground it can be decompressed, based on the particular compression technique employed in the spacecraft, to provide non-compressed data which is finally processed. It is appreciated however that when communicating compressed data a much lower average bit error rate is generally required as compared with non-compressed data since a single error in the compressed data stream is often propagated by the data decompressor into many errors in the reconstructed data.

OBJECTS AND SUMMARY OF THE INVENTION

It is a primary object of the present invention to provide a new communication system for communicating data from a spacecraft to Earth.

Another object of the present invention is to provide a new spacecraft communication system for communicating compressed data at an acceptable bit error probability.

These and other objects of the invention are achieved by providing a communication system in which a concatenated RS Viterbi channel is employed and through which compressed data is communicated. The invention will first be described in connection with communicating compressed image data, although the invention is not intended to be limited thereto. The invention is based on an analysis indicating that by proper choice of the depth of interleaving of the RS codewords and due to the properties of the Viterbi channel compressed image data can be communicated through the concatenated RS-Viterbi channel at a sufficiently low RS codeword error probability, even under non-ideal conditions, i.e., when $\alpha \neq \infty$, at a system signal-to-noise ratio $E_b/N_o$ which is on the order of the $E_b/N_o$ needed for communicating via a Viterbi channel alone non-compressed image data at an acceptable bit error probability. This arrangement is possible since the analysis indicates that, unlike the Viterbi channel in which for relatively low average bit error probability on the order of $10^{-4}$ the system's $E_b/N_o$ increases greatly as $\alpha$ decreases, in the concatenated RS-Viterbi channel by proper choice of parameters, including RS codeword interleaving depth, the change in $E_bN_o$ for low codeword error probability changes only by a small factor as $\alpha$ decreases.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
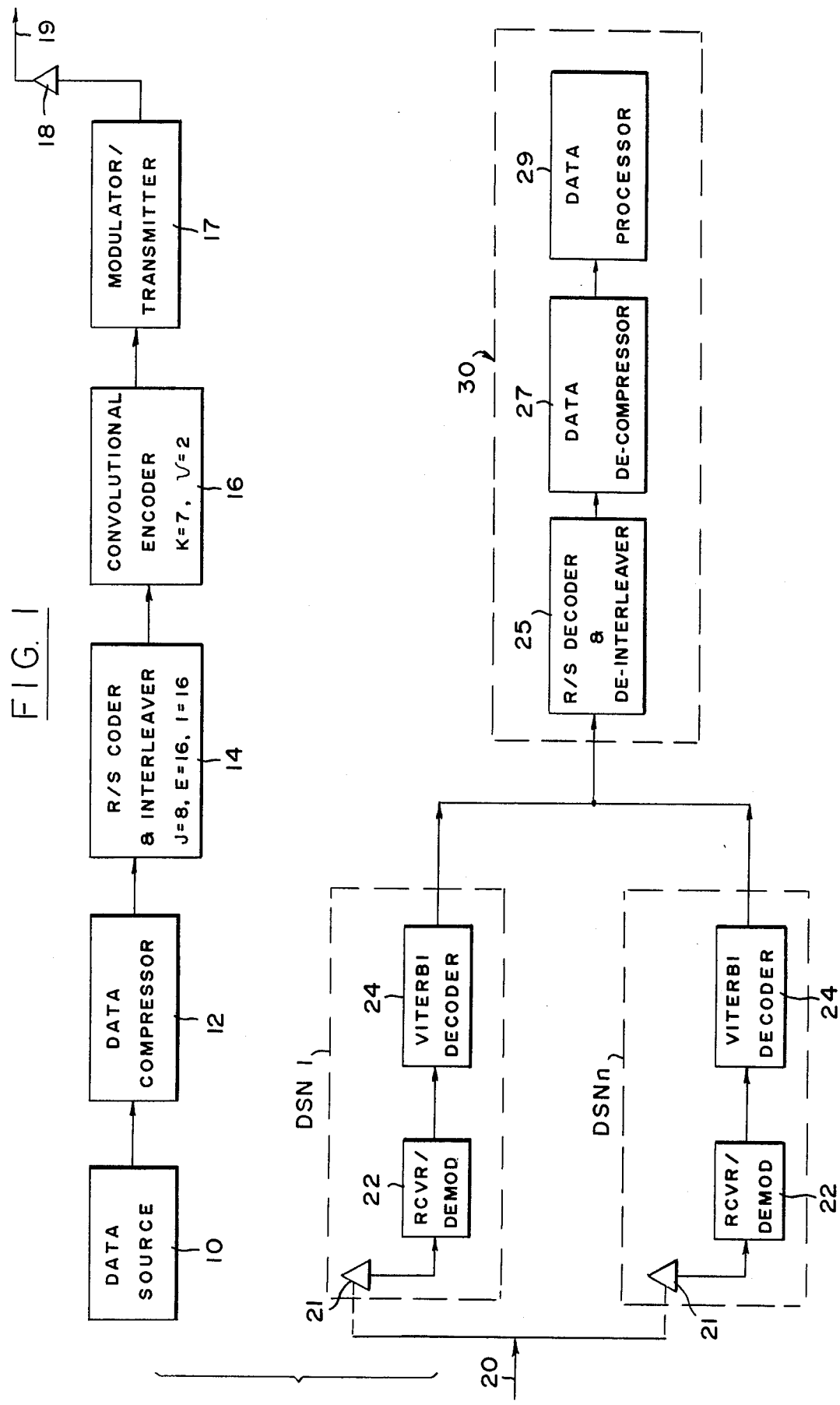
FIG. 1 is a general block diagram of the novel communication system of the present invention.

Attention is first directed to FIG. 1 wherein numeral 10 designates a source of data in a spacecraft, the data being in the form of a stream of bits. The data from source 10 is supplied to a data compressor 12 whose function is to compress the data in accordance with preselected compression criteria, so as to reduce the number of bits as compared with those supplied thereto from source 10.

For explanatory purposes, let it be assumed that a picture was taken of a planet and that the picture consists of an array of 512 by 512 picture elements, hereinafter defined as pixels and that each group of 64 by 64 pixels represents a source block, with the entire picture being represented by 64 source blocks. It is further assumed that for each pixel data source 10 provides a stream of eight bits. Let the number of bits of an uncompressed source block defined as $R_{pcm}{}^B$ (which in the particular example is $64 \times 64 \times 8$) and after compression the number of bits for each source block be defined as $R_c{}^B$. Thus, compression factor, provided by compressor 12, may be defined as $CF = R_{pcm}{}^B/R_c{}^B$. Clearly, the principal motivation for data compression is, of course, to obtain compression factors (CF) greater than 1. Various schemes have been proposed for data compression and since the present invention is not directed to a specific scheme, the data compressor 12 will be shown only in block form.

The compressed data from 12 is supplied to a Reed-Solomon (RS) coder and interleaver 14. For explanatory purposes it is assumed that $J=8$, representing the number of bits per RS symbol, $E=16$, where $E$ is one-half the number of parity symbols per RS codeword or the number of RS symbols which can be corrected and $I=16$, $I$ being the number of interleaved RS codewords representing an RS block.

As is appreciated by those familiar with the art a Reed Solomon code is a BCH code with a specific set of parameters. The prior art provides all the background necessary to build an RS coder and interleaver as well as an RS decoder and deinterleaver. Therefore in the present application these units or devices will be represented in block form only. The prior art includes at least reference C, chapter 6 of "Information Theory and Reliable Communication" by R. G. Gallager published in 1968; "Algebraic Coding Theory" by E. R. Berlekamp, published in 1968; and an article by James L. Massery, "Shift Register Synthesis and BCH Decoding", IEEE Trans. Info. Theory, vol. IT-15, pp. 122–127, January 1969. There are other publications known to those familiar with the art.

The compressed data from 12 after being RS coded into codewords which are interleaved to form an RS code block are in turn coded by a convolutional encoder 16, assumed to have a constraint length $K=7$ and a code rate of ½, i.e., $\nu=2$. The output of the latter is then transmitted to Earth through a modulator/transmitter 17, hereinafter also referred to as transmitter 17, which includes a transmitting antenna 18. The transmitted signals are represented by arrow 19. Herein it is assumed that in modulator/transmitter 17 antipodal PSK-PM modulation of a square wave subcarrier with S-band or X-band carrier takes place.

On Earth several deep space network stations designated DSN1-DSNn are located at different locations to insure that at any time the signals 19 from the spacecraft are received at at least one of the DSN's. These stations are identical. The signals received on Earth are designated by numeral 20. Each DSN includes a receiver antenna 21 connected to receiver/demodulator 22, hereinafter simply referred to as the receiver 22, which is assumed to include a phase locked loop coherent demodulator with a three-bit quantized symbol output. Herein, it is assumed that the signals from the spacecraft to Earth are subject to wideband Gaussian noise. That is, the communication channel including the transmitting and receiving antennas as well as the environment through which the signals propagate between is a wideband Gaussian channel.

In accordance with the present invention, each DSN also includes a Viterbi decoder 24 which is designed to respond to the receiver/demodulator output and attempts to reproduce the original data stream entering the convolutional encoder 16 in the spacecraft.

As hereinbefore defined the Viterbi decoder 24 together with the encoder 16 and the modulator/transmitter 17 and the receiver/demodulator 22 together with the wide band Gaussian noise channel (between the spacecraft and Earth) represent a Viterbi channel. With $K=7$ and $\nu=2$, the Viterbi channel is sometimes referred to as the Jupiter/Saturn channel by those involved in constructing a communication channel for a spacecraft to be used in missions planned for the late 1970's to explore Jupiter and Saturn. Viterbi decoders with different K and $\nu$ are presently available as off the shelf items. One source is Linkabit Corporation of San Diego, Calif., whose literature extensively describes such channels. Modulator/transmitters, like 17 and receiver/demodulators like 22 as hereinbefore defined as well known by those familiar with the art of communication, particularly as related to space communication. Such modulator/transmitters and receiver/demodulators have been used in prior space missions and are described in literature.

The output of the Viterbi decoder 24 (of each DSN) is directly supplied to a single RS decoder and deinterleaver 25, hereinafter simply referred to as the RS decoder 25. Its function is to decode the Viterbi decoder output by separating the received 16 (when $I=16$) interleaved RS codewords into separate RS codewords and thereafter decode these words. The output of RS decoder 25 in essence represents the compressed data which data compressor 12 supplied to the RS coder 14 in the spacecraft. The compressed data from RS decoder 25 is then supplied to a data decompressor 27 which effectively reconstructs from the compressed data an approximation to the original noncompressed data, provided in the spacecraft by data source 10 to data compressor 12. The reconstructed non-compressed data from decompressor 27 is supplied to a data processor 29 for processing, e.g., produce an approximation of the original picture, except for any lost source blocks due to errors in the transmission. The RS decoder 25, the data decompressor 27 and the data processor 29, are located at a central data processing center 30, such as the one presently existing for processing data received from prior space missions.

It should be appreciated that the arrangement shown in FIG. 1 is a concatenated RS-Viterbi channel or system for communicating compressed data from a spacecraft. It is conceded that such a channel is discussed in reference C. However, therein the channel was only analyzed under ideal conditions ($\alpha = \infty$). Also in reference C no consideration was given to the usefulness of the channel to transmit compressed data under any conditions.

Figure 2:
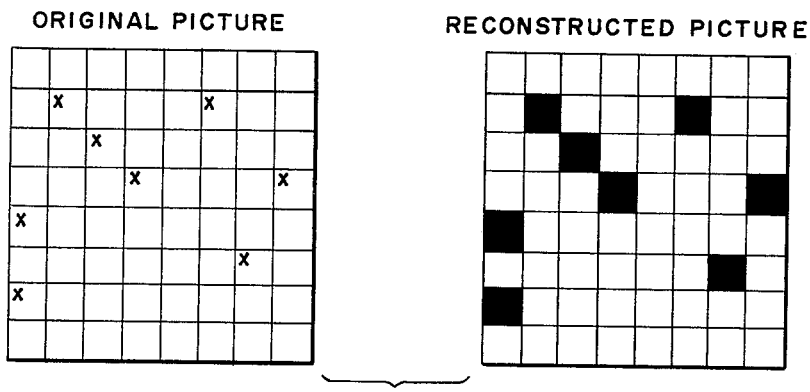
FIG. 2 is a simplified diagram of an original and reconstructed picture used to indicate the effect of source block losses due to random errors.

The great advantage of the channel to transmit compressed data will become apparent from the following discussion on which the invention is based. The discussion may be facilitated by considering compressed image data. As hereinbefore suggested let it be assumed that the data source 10 is one providing a stream of bits representing an original picture, as shown in FIG. 2. Let it be assumed that the picture consists of 512 by 512 picture elements or pixels, and each pixel from source 10 is represented by eight bits (for 256 grey level quantization). Let it further be assumed that the data compressor 12 compresses the data into source blocks, each consisting of a two dimensional array of 64 by 64 pixels.

These source blocks are made independent by preceding the bits representing each source block with a sufficiently long sync word. Each sync word is used to identify the start of the following source block. By choosing a sufficiently large source block (in terms of the number of bits) the sync word has negligible effect on the transmission rate. In FIG. 2, the smaller squares represent the separate source blocks. In FIG. 2 a small x in a source block means that after reception the corresponding source block has an error somewhere in it. It is assumed that a bit error in any source block, regardless of where the error occurs within a compressed source block, the block is completely lost, since a single error in the compressed data stream is often propagated by the data decompressor into many errors in the decompressed data. The above assumption is a worst case assumption and therefore includes any data compression process which may be used.

A key point in this example is that because the location of bit errors was generally uniformly distributed throughout the compressed data, each error appeared in a different compressed source block. Consequently, each error caused the loss of a different source block. If such compressed data were to be transmitted through a Jupiter/Saturn channel (a Viterbi channel with $\underline{K=7}$ and $\nu=2$) extremely low average bit error rates $\overline{P_b}$ on the order of $10^{-6}$ and $10^{-7}$ will be required. And, even then the errors will tend to occur in approximately this random fashion.

Figure 3:
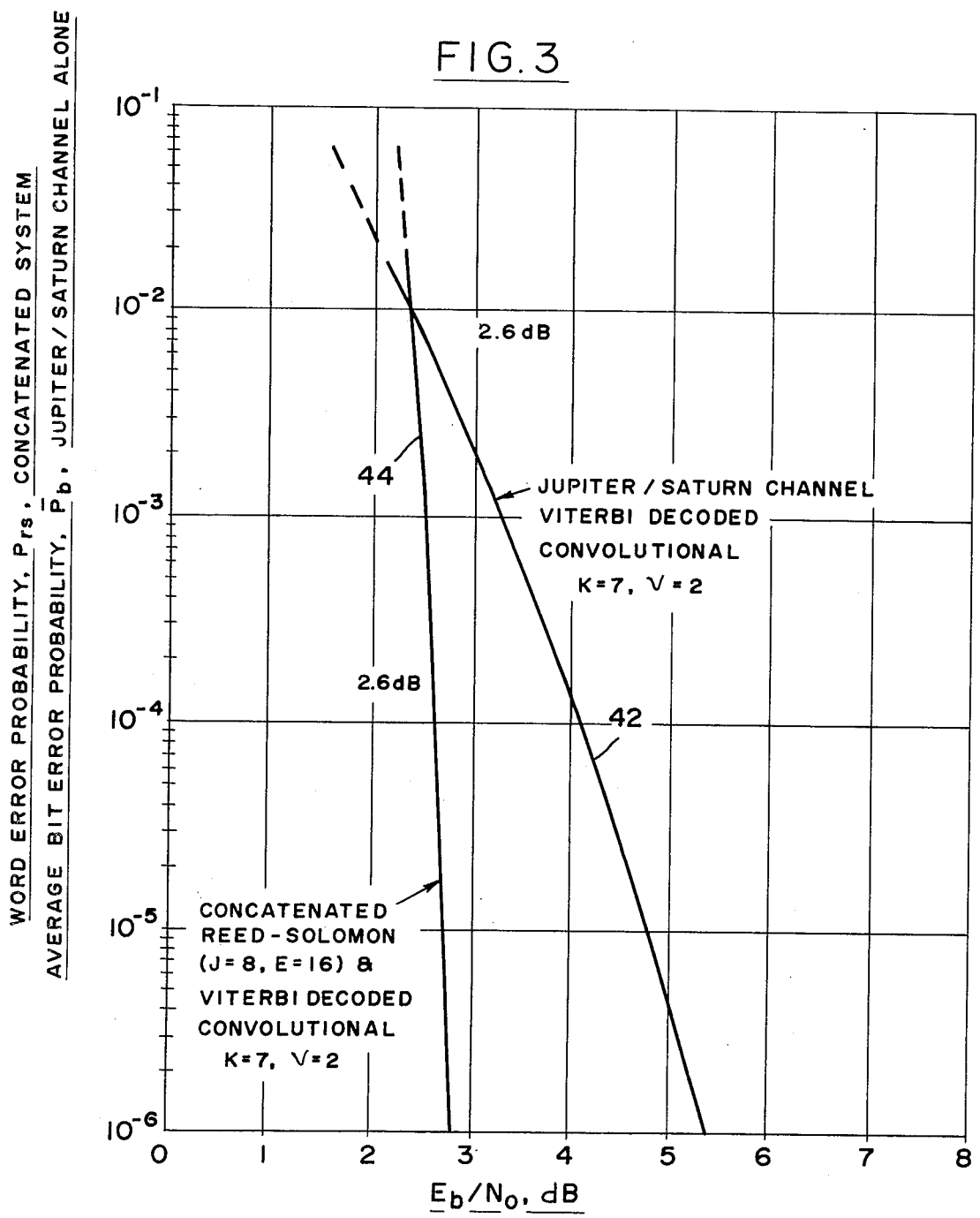
FIG. 3 is a diagram of performance curves for a Viterbi channel and the concatenated system under ideal conditions.

Reference is now made to FIG. 3 in which the Jupiter/Saturn channel performance curve is shown, under assumed ideal conditions, i.e., $\alpha = \infty$. It is designated by numeral 42. As is known to those familiar with the art for uncompressed image data, hereinafter referred to as uncompressed PCM, average bit errors probability $\overline{P_b}$ below $5 \times 10^{-3}$ is regarded as negligible. Thus, the Jupiter/Saturn channel can operate as a signal-to-noise ratio, $E_b/N_o \approx 2.6$ db. However, to obtain average bit error bit probability on the order of $10^{-6}$ for compressed data the required increase in $E_b/N_o$ is about 3 db higher which corresponds to a reduction in transmission rate by a factor of about two under only ideal conditions. Thus, a net gain cannot be obtained from the data compression and the Jupiter/Saturn channel unless the average compression factor (CF) exceeds approximately two. However, under practical operating conditions, as will be described hereinafter, in which $\alpha \ne \infty$ much higher $E_b/N_o$ is required to obtain very low bit error probability on the order of $10^{-6}$. Furthermore, in the Jupiter/Saturn channel with relatively low values of $\alpha$, bit error probability on the order of $10^{-6}$ or less is not even obtainable, except with extremely large $E_b/N_o$. This will become apparent from the discussion in connection with FIG. 10.

Figure 4:
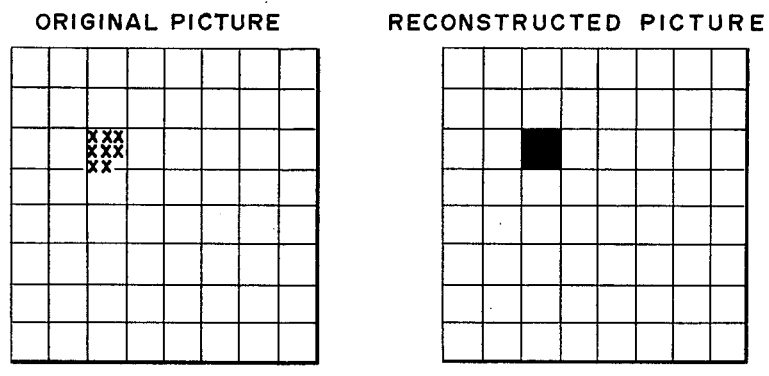
FIG. 4 is a diagram similar to FIG. 2 except that all errors are assumed to be concentrated in one source block.

The reason that the Jupiter/Saturn channel is not efficient for data compression communication is due to the fact that its performance curve is not steep enough. That is, to lower $\overline{P_b}$ from $5 \times 10^{-3}$ to about $10^{-6}$ requires a large increase in $E_b/N_o$. Another important point is the general random distribution of individual bit errors in the Jupiter/Saturn channel at low $\overline{P_b}$ values on the order of $10^{-6}$. Consequently, if the Jupiter/Saturn channel were used, due to the random distribution of the individual bit errors, the reconstructed picture would look as shown in FIG. 2 with the black source blocks being lost blocks, which in most cases would be unacceptable. If should thus be appreciated that one desired property of the channel is that for a given average error probability, the errors occur in bursts. For example, if as shown in FIG. 4, which is similar to FIG. 2, the eight errors were to occur in one source block since the first error in the compressed source block causes all the damage, the other seven errors are of no consequence and therefore in the reconstructed picture the eight errors will only cause the loss of a single source block.

The proposed solution to this problem is provided by the insertion of the RS coder 14 in the spacecraft and the RS decoder 25 on the ground. A key to the simplicity of this configuration is that the RS decoder need not be inserted in each DSN station and only one such decoder 25 is needed at the central data processing center 30. The RS encoder 14 can be considered together with the data compressor 12 as the source encoding unit, and the RS decoder 25 as part of the data processing center, with the communication channel being the Jupiter/Saturn channel (Viterbi channel with $K=7$, $\nu=2$). However, to demonstrate that the addition of the RS coding and decoding offers a solution for the communication of compressed data the purpose is better served by regarding the RS coder and decoder as part of the concatenated RS-Viterbi channel or system.

Figure 5:
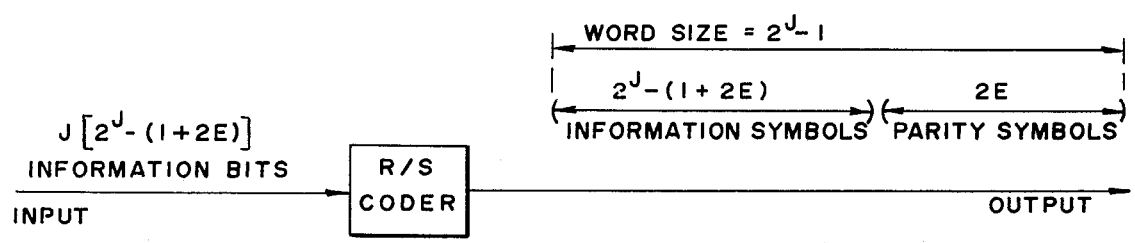
FIG. 5 is a simple diagram useful in explaining the operation of a RS coder.
Figure 6:
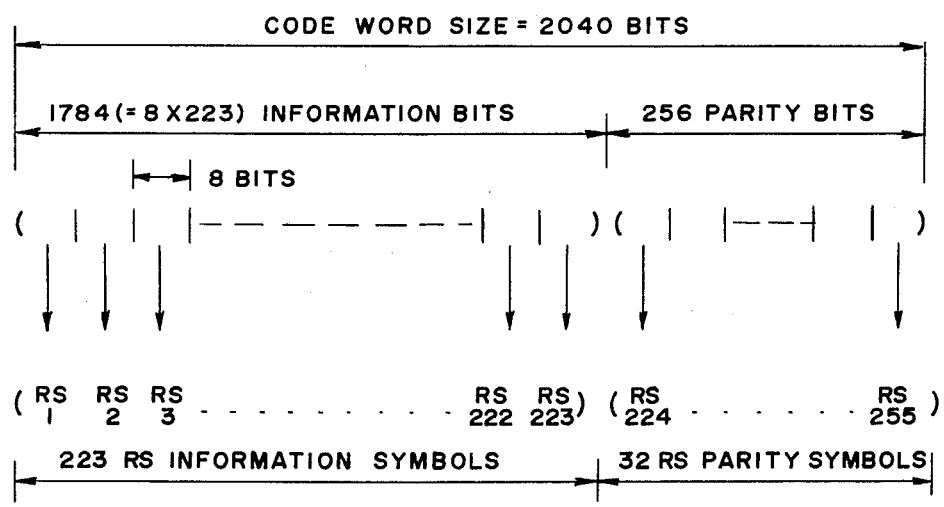
FIG. 6 is a basic RD codeword structure for $J=8$, $E=16$.

As is appreciated by those familiar with RS coders and as diagrammed in simple form in FIG. 5, let it be assumed that $J[2^J - (1+2E)]$ information bits from a source, such as compressor 12, are received. The result of the coding operation is a codeword of $2^J - 1$ RS symbols of which the first $2^J - (1+2E)$ are RS information symbols, representing the incoming information bits, and the remainder of the codeword is filled with 2E parity symbols. An RS symbol (whether information or parity) is in error if any of the J bits making up the symbol are in error. E represents the number of correctable RS symbol errors in an RS codeword. That is, if E or less RS symbols in a codeword are in error in any way, the RS decoder will be capable of correcting them. FIG. 6 is a diagram of the basic RS codeword structure for $J=8$, $E=16$, formed for a stream of 1784 information bits entering the RS coder 14.

To make the most effective use of the power of RS coding when concatenated with Viterbi decoded convolutional codes requires interleaving. This is because of the burstiness in error events experienced by Viterbi decoders at values of $E_b/N_o$ of interest (between 2.0 and 2.5 db). Without interleaving Viterbi decoder burst error events would tend to occur within one RS codeword. That one codeword would have to correct all of these errors. Thus, over a period of time there would be a tendency for some codewords to have "too many" errors to correct (i.e., greater than 16, when $E=16$) while the remaining codewords would have "too few" (i.e., much less than 16). This situation does not make effective use of the capabilities of the RS coding. The effect of interleaving is to spread these bursty error events over many codewords so that the RS decoder tends to work uniformly hard on all the data.

Two methods of interleaving will be investigated here. We will call them Interleave A and Interleave B. The first exhibits a slight performance advantage in the transmission of compressed data whereas the second offers an advantage in memory requirements for the onboard RS coder 14. In both cases we will assume an interleaver depth, $I=16$.

INTERLEAVE A.

Figure 7:
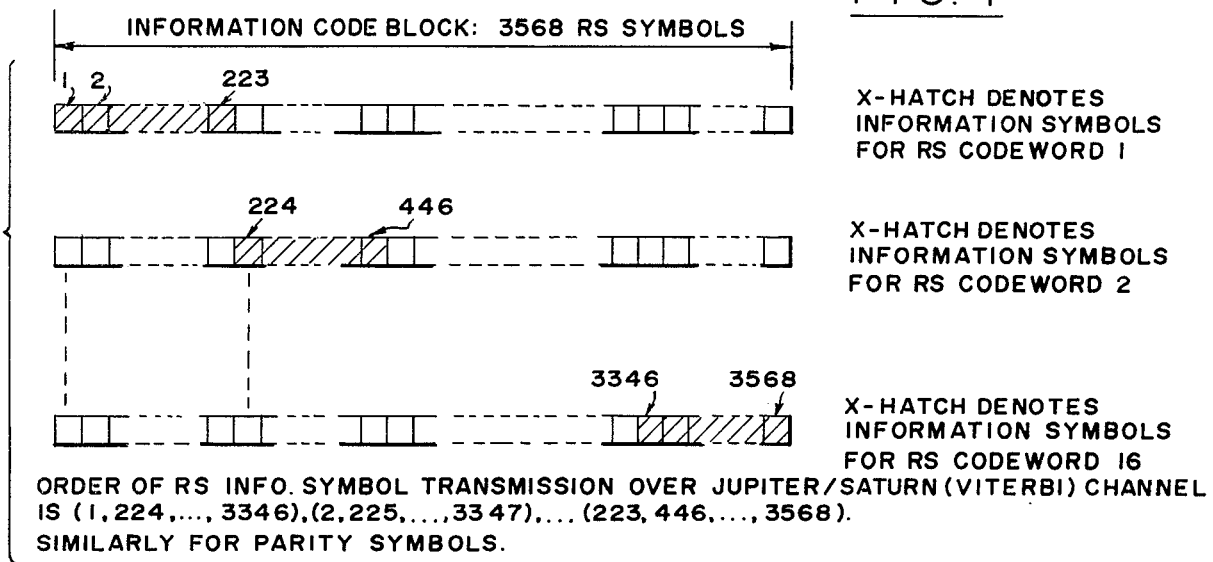
FIGS. 7 and 8 are useful in explaining two different interleave structures for interleaving $I=16$ RS codewords.

A diagram illustrating Interleave A is shown in FIG. 7. The consecutive numbers $1, 2 \ldots, 3568$ denote labeling of consecutive RS information symbols which are to be interleaved and coded into 16 RS codewords. These symbols correspond to the compressed data (grouped into eight bit symbols) as it would enter the RS coder 14 from data compressor 12. We call this sequence of bits an Information Code Block to distinguish it from a Code Block which also includes parity symbols. The length of an Information Code Block is $(16)(223) = 3,568$ RS symbols or $(8)(3568) = 28,544$ bits.

The crosshatched regions specify which RS information symbols belong to each of the 16 codewords. As specified, the first 223 form the information symbols of codeword 1, the second 223 information symbols belong to codeword 2, and so on. Without interleaving these symbols, along with their 32 parity symbols, would be transmitted over the Jupiter/Saturn channel in the order in which they appear. Thus a particularly long burst of errors from the Viterbi decoder would tend to affect the symbols of only one codeword. With Interleave A the order of RS information symbol transmission is $(1, 224, \ldots, 3346), (2, 225, \ldots, 3347), \ldots, (223, 446, \ldots, 3568)$. That is, the first symbol from codeword 1, the first symbol from codeword 2, ..., the first symbol from codeword 16, the second symbol from codeword 1, and so on. The parity symbols would follow in the same manner. With this arrangement it should be clear that a burst of errors that spans $k \leq 16$ RS symbols (128 bits) will be distributed among $k$ different codewords.

Since the information symbol 3346 in the 16th symbol to be transmitted, memory for the complete Information Code Block must be provided in addition to that required for parity symbol generation. However, with present day technology this much working memory today is really insignificant. For example, Advanced Pioneer mission planners are presently assuming at least $10^6$ bits of working memory. Single solid state chips are available off the shelf with 4096 bits of random access memory. However, we point out that the second interleave method, Interleave B, does offer an advantage in this area by requiring memory only for the parity symbols.

If 16 or less RS symbols of a codeword are in error before entering the RS decoder, then all information symbols of that codeword leaving the decoder will be correct. No decoding error is made. On the other hand, if more than 16 RS symbols of a particular codeword are in error before decoding, then a decoding error will occur and the output information symbols may have many errors. If we interpret FIG. 7 as describing an output Information Code Block we see that the effect of a decoding error on a particular codeword is constrained to the corresponding crosshatched region for that codeword. Thus, for Interleave A the effect of an RS decoding error is confined to consecutive symbols. An RS decoding error will appear as a burst of errors of up to 223 symbols in length (1784 bits). Earlier we pointed out that this bursty property is desirable for the transmission of compressed data. We will see that it is the relatively greater burstiness of Interleave A over Interleave B that gives Interleave A a slight performance advantage.

INTERLEAVE B.

Figure 8:
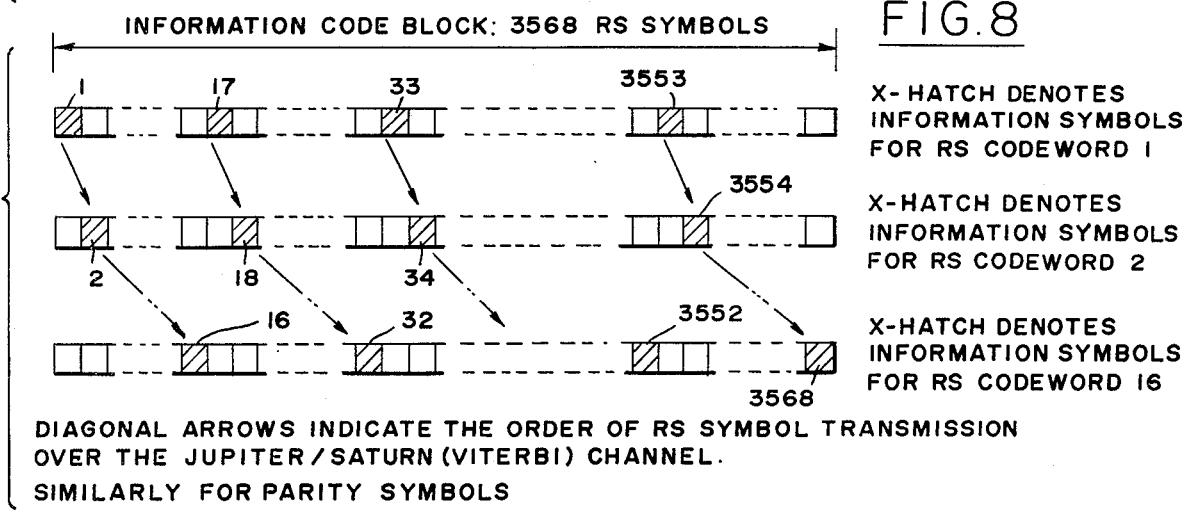

Before investigating the specific effects of RS codeword errors on compressed data, we need to establish the basic structure of Interleave B. This is shown in FIG. 8. Again the consecutive numbers 1, 2, ..., 3568 denote the labeling of consecutive information symbols. Also as in FIG. 7, the crosshatched regions specify which information symbols belong to each of the 16 codewords. Note that for each codeword, adjacent symbols are separated by 15 other symbols in the Information Code Block. For example, the information symbols for codeword 1 are made up of Information Code Block Symbols 1, 17, 33, ..., 3553. As indicated by the arrows, the order of transmission of RS information symbols (over the Jupiter/Saturn channel) is exactly the same way they appear in the Information Code Block 1, 2, ..., 16, 17, ..., 3568. Parity symbols would follow in the same manner. It is easy to see that this accomplishes the desired interleaving (e.g., a burst error event from a Viterbi decoder would have to span symbols 2 through 16 in order to affect adjacent symbols 1 and 17, of codeword 1). In addition this ordering means that no memory is required for the Complete Information Code Block, since this data can be transmitted, unchanged, as it arrives from data compressor 12. Thus, significantly less memory is required for this form of interleaving.

Just as we did in FIG. 7 we can interpret FIG. 8 as describing an output Information Code Block so that, as before, the effect of a decoding error on a particular codeword is specified by the crosshatched regions for that codeword. Unlike Interleave A, we note that these crosshatched regions are spread throughout the Information Code Block rather than constrained to a consecutive string of 223 symbols. The consequences of this spread-out will be seen later.

The choice of interleaver $I=16$ was selected to achieve statistical independence between RS symbols of individual codewords "before decoding". That an interleaver depth of 16 is sufficient to make any dependencies negligible for our specific concatenated coding system is highly plausible. Error bursts from a Viterbi decoder exceeding 120 bits (15 RS symbols) are extremely unlikely for the $K=7$, $\nu=2$ code for $E_b/N_o$ values as low as 1.4 db ($<10^{-5}$). It was primarily such observations which led to choose I=16 (along with the fact that 16 is a power of 2). This choice would seem to even be overdoing it for the specific code of the Jupiter/Saturn channel, particularly under nominal phase coherent receiver conditions (for which our interests will be restricted to Viterbi decoder $E_b/N_o$ values greater than about 2 db). Perhaps the major point to keep in mind is that even doubling interleaver depth to 32 does not severely impact the implementation of either coder or decoder.

We will continue with the assumption that enough interleaving is provided to make the assumption of independent RS symbol error events a valid one. An interleaver depth of no more than $I=16$ should be completely adequate in this sense. From a more practical point of view I=16 may not be necessary. If desired $I=8$ may be chosen.

With $\pi$ denoting the average probability of an RS symbol error leaving the Viterbi decoder (group of eight bits), the probability of an RS codeword error (using Interleave A or B) is given by $$P_{RS} = \Pr \begin{bmatrix} \text{more than 16} \\ \text{independent symbol} \\ \text{errors} \end{bmatrix} \quad (1)$$

$$= \sum_{k=17}^{255} \binom{255}{k} \pi^k (1-\pi)^{255-k}$$

Thus $P_{RS}$ is determined entirely by $\pi$. The term $\pi$ can be determined by directly monitoring the correctness or incorrectness of RS symbols emanating from simulated Viterbi decoders at various signals to noise ratios, or from Viterbi burst error statistics to obtain the same results. A performance curve ($P_{RS}$ vs $E_b/N_o$) which was derived from Equation (1) and the experiments which produced the various values of $\pi$ is shown in FIG. 3, under which ideal conditions ($\alpha = \infty$) are assumed.

The effect of a codeword error on compressed data in the form of source blocks will now be discussed using the above referred to example for source blocks. That is, attention is restricted to source blocks originating from 4096 pixels (e.g., 64 by 64 pixel arrays). Hereinbefore $R_c^B$ was defined as the number of bits of compressed data representing a source blocks, and $R_{pcm}^B$ the number of bits of 4096 pixels representing a source block without compression. With eight bits/pixel $R_{pcm}^B = 8 \times 4096$. However, the number of bits of a compressed source block, i.e., $R_c^B$, clearly depends on the compression factor, CF.

Figure 9:
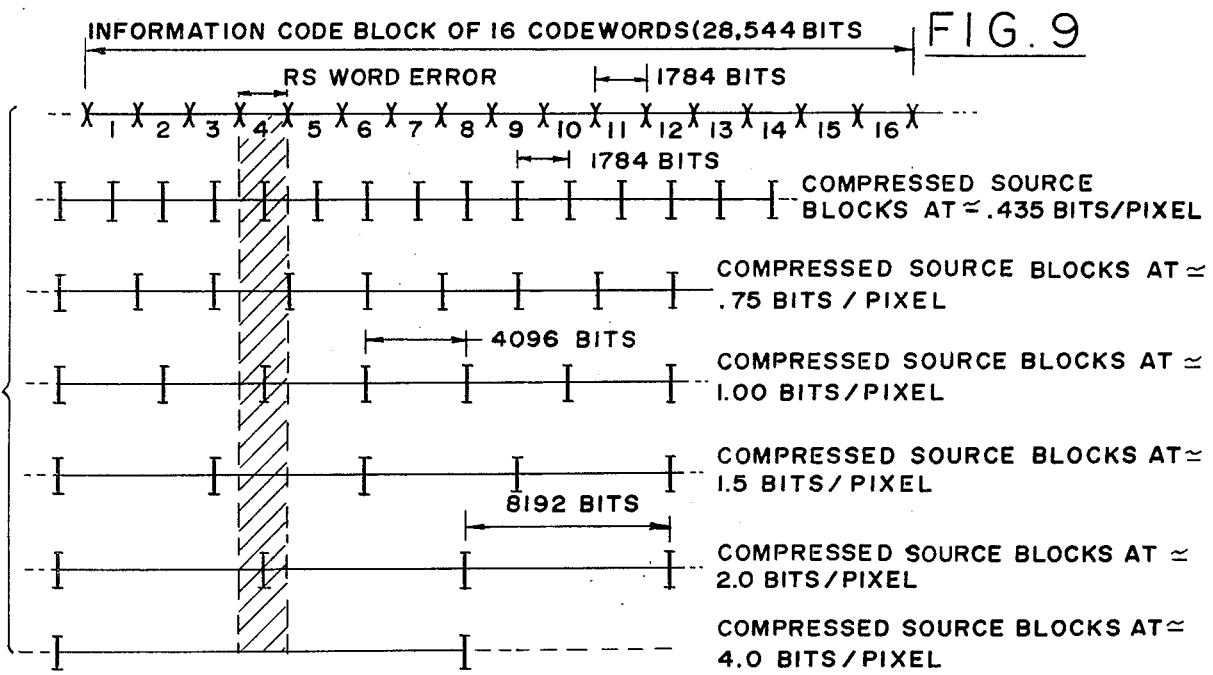
FIG. 9 is a diagram useful in explaining the effect of a RS codeword error using interleave A shown in FIG. 7.

FIG. 9 illustrates the effect of an individual RS codeword error on sequences of compressed source blocks when Interleave A is employed. At the top of the figure is shown an output Information Code Block in much the same manner as in FIG. 7. The subsequences of decoded information bits for each of the 16 codewords are indicated by the parentheses and are labeled from 1 to 16. Each subsequence is 1784 bits long for a total of 28,544 bits. The number of compressed source blocks making up the 28,544 bits depends on the distribution of compressed source block rates, $R_c^B$. That is, how many bits it takes to represent each compressed source block. We will look at the simpler case in which each compressed source block in the sequence is represented by a fixed number of bits.

Shown immediately below the Information Code Block in FIG. 9 is a sequence of compressed source blocks which each require 1784 bits. This is equivalent to about 0.435 bits/pixel (CF=20) assuming 4096 pixel source blocks. Each compressed source block is indicated by brackets. Note that the start of the first RS codeword is not (necessarily) synchronous with the start of a compressed source block. Thus, the Information Code Block contains data from 17 compressed source blocks.

Below this example are shown several similar illustrations for increasing compressed source block rates (lower compression factors) starting with average rates of 0.75 bits/pixel and increasing up to 4.0 bits/pixel. Note that because of the increasing number of bits to represent a compressed source block the Information Code Block represents fewer and fewer source blocks. At four bits/pixel a compressed source block is over 16,000 bits long so that an RS Information Code Block only "overlaps" two or three compressed source blocks.

To investigate the effect of an RS codeword error, we restate some earlier results and assumptions. First we assume that if any error occurs in a compressed source block, that complete source block is lost but no more. We add to this by assuming that if an RS codeword is in error after decoding, all decoded information bits are in error for that codeword. Finally we recall from FIG. 7 that when Interleave A is used, the effect of a codeword error is constrained to a consecutive sequence of information bits (symbols). In FIG. 9 these potential error sequences are those enclosed by parentheses and labeled 1 to 16. In FIG. 9 it is assumed that codeword 4 was in error. By our assumptions above, any compressed source block which is represented by this sequence of wrong bits is lost. In FIG. 9 this corresponds to any compressed source block which falls in the crosshatched region. In all cases we observe the following: using Interleave A, the number of source blocks lost due to an RS codeword error is 1 or 2.

To obtain similar results for Interleave B, we recall from FIG. 8 that when a single RS codeword errors occurs the effect is spread uniformly across the complete Information Code Block. Thus, the typical number of lost source blocks is simply the number of compressed source blocks represented by the Information Code Block. Extending our earlier observations using FIG. 9 results in a summary comparison of Interleave A and B in Table 1.

Table 1

Comparison of Interleave Methods

| Rate of Compressed Source Block in Bits | Rate in Bits/ Pixel | Error Event Typical No. of Lost Source Blocks due to RS Word Error | |
|---|---|---|---|
| | | Interleave A | Interleave B |
| 1,784 | ≈ 0.435 | 1 or 2 | 15 or 16 |
| 4,096 | 1.0 | 1 or 2 | 9 or 10 |
| 8,192 | 2.0 | 1 or 2 | 5 or 6 |
| 16,384 | 4.0 | 1 or 2 | 2 or 3 |

*Source block contains 4096 pixels.

The discussions just completed describe the effect of individual RS codeword errors in terms of lost source blocks. The next question to address is the determination of the largest value of $P_{RS}$ for which the overall impact of these error events is considered negligible. More simply, how often can we let these error events occur.

With an RS codeword error rate given by $P_{RS}$, on the average, a source block error event would occur every $1/P_{RS}$ RS codewords.

But the number of source blocks per RS codeword is given by $$\gamma = (1784 \text{ information bits/RS word})/(R_c^* \text{ bits/-source blocks}) \quad (2)$$

Thus, on the average, a source block error even would occur every $$N_{SB} = \gamma/P_{RS} \text{ source blocks} \quad (3)$$

To carry this point further to a situation which is more readily visualized, assume that our 4096 pixel source blocks are 64 by 64 pixel arrays. Further, assume that the frame size for a picture is 512 by 512 pixels making up a total of 64 source blocks as in the example of FIG. 2. Using equation (3) we can then say that, on the average, a source block error event would occur every $$N_p = (N_{SB})/(64) \text{ pictures} \quad (4)$$

Equation 4 is evaluated for three values of $P_{RS}$ in Table 2.

Table 2

| Source Block Rates in Bits/Pixel | Number of Pictures Between Source Block Errors $N_p$(Eq. 4) = Average Number of Pictures Between Source Block Error Events (see Table 1) | | |
|---|---|---|---|
| | $P_{RS} = 10^{-3}$ | $P_{RS} = 2 \times 10^{-4}$ | $P_{RS} = 10^{-4}$ |
| ≈ 0.435 | 13.6 | 68 | 136 |
| 1.0 | 6.8 | 34 | 68 |
| 2.0 | 3.4 | 17 | 34 |
| 4.0 | 1.7 | 8.5 | 17 |

*Source Block contains 4096 pixels
**Picture Size: 512 by 512 pixels (64 source blocks)
***$P_{RS}$ = Probability of an RS codeword error From Table 2 it is seen that with the choice of $P_{RS} = 10^{-4}$ and a source block rate of 4.0 bits/pixel, typically only 1 out of 17 pictures would have any degradation due to the channel. That is, the quality of 16 out of 17 pictures would be controlled solely by the characteristics of the particular data compression operation. Typically, every 17th picture would suffer the loss of one or two source blocks with Interleave A, or two or three source blocks with Interleave B.

Decreasing the source block rate (increasing the compression factor) lengthens the interval between source block error events. Specifically, with $P_{RS} = 10^{-4}$ and a source block rate of 0.435 bits/pixel, we see that typically only 1 out of 136 pictures would have any loss in quality associated with the channel. Every 136th picture or so would suffer the loss of one or two source blocks if Interleave A were used or 16 to 17 source blocks if Interleave B were used (see Table 1).

From the performance curve of the concatenated RS-Viterbi system, shown in FIG. 3 and designated by 44, it is seen that for $P_{RS} = 10^{-4}$ the signal-to-noise ratio $E_b/N_o$ is on the order of 2.6 db. Due to the steepness of the curve, changing $P_{RS}$ by an order of magnitude requires only a change in $E_b/N_o$ of about 0.1 db. Thus, the selection of the highest acceptable value of $P_{RS}$ as the value of RS codeword error probability, below which the effect of lost source blocks can be considered negligible for both interleave methods, is not critical. For purposes of discussion $P_{RS} = 10^{-4}$ is selected as the highest acceptable value.

Before comparing the two performance curves, shown in FIG. 3, attention is given to the use of the channel to transmit uncompressed data, generally referred to as uncompressed PCM. When an RS codeword error occurs during the transmission of uncompressed PCM, the result is a burst of errors extending over 1784 bits using Interleave A or spread more thinly over 28,544 bits using Interleave B. If we assumed eight bits/pixel for each PCM sample, then these error bursts would occur typically once every eight pictures or so If $P_{RS} = 10^{-4}$. Any imagined advantage to accepting a higher frequency of these error bursts in order to increase transmission rate should be tempered by the fact that changing $P_{RS}$ by an order of magnitude requires only 0.1 db. Consequently, the insignificant increase in transmission rate will result in error bursts occuring more frequently. For example, increasing $P_{RS}$ to $10^{-3}$ would result in an error burst which would occur once in every picture. Therefore, $P_{RS} = 10^{-4}$ is also chosen as the maximum RS codeword error probability below which degradation to uncompressed PCM data can be considered negligible.

Attention is again directed to FIG. 3 in which the performance curves for the Jupiter/Saturn channel (Viterbi channel with $K=7$, $\nu=2$) and the concatenated RS-Viterbi system (with $J=8$, $E=16$, $K=7$, $\mu=2$) are diagrammed. It should be recalled that for uncompressed PCM data, transmitted over the Jupiter/Saturn channel, $\overline{P_b} = 5 \times 10^{-3}$ is the approximate value of average bit error probability below which the effect due to errors can be considered negligible. This corresponds to an $E_b/N_o$ of 2.6db. Similarly, as previously assumed for both compressed or uncompressed data transmitted on the concatenated RS-Viterbi channel $P_{RS} = 10^{-4}$ is a reasonable choice of RS codeword error probability below which any effects due to the channel can be considered negligible. This also corresponds to an $E_b N_o$ of approximately 2.6db. Thus, it should be appreciated that uncompressed data on the Jupiter/Saturn channel and both compressed and uncompressed on the concatenated RS-Viterbi channel can be transmitted at about the same rate with negligible degradation due to channel errors. It should be pointed out that hereinbefore worst case assumptions for the error sensitivity of compressed data were made. Namely, it was assumed that any (one or more) source blocks contained in any RS codeword in error cannot be corrected and that all compressed data contained in such source blocks is lost. Therefore, the above statement that for compressed data, transmitted on the concatenated channel, $P_{RS} = 10^{-4}$ is a reasonable choice of RS word error probability below which any effects due to the channel can be considered negligible, applies to virtually any data compression technique.

From the foregoing, it is thus seen that in accordance with the present invention the concatenated RS-Viterbi channel is used to communicate compressed data without having to give up significant transmission rate, as compared with the transmission rate required to transmit uncompressed data with the Jupiter/Saturn channel alone. The ability to transmit compressed data with the concatenated RS-Viterbi channel without sacrifice of transmission rate has not been realized nor discussed by any of the prior art references.

It should be appreciated that any scientific mission to the planets will include data other than that provided by imaging experiments. This includes both general science and engineering measurements. Some of this data is considered much more sensitive to channel errors than uncompressed PCM imaging data. This imposes difficulties when the Jupiter/Saturn channel is employed, as is proposed for the Jupiter/Saturn missions. As we discussed for compressed data, just a few errors can severely degrade a complete block of science data for some experiments. It is quite clear that the transmission of such data over the Jupiter/Saturn channel at a $5 \times 10^{-3}$ average bit error rate produces totally unacceptable degradation. A "cleaner" channel is required for this data.

During cruise operations, when science and engineering data totally monopolize the telecommunications channel, an acceptable but not desirable alternative is provided by simply lowering the transmission rate (increasing $E_b/N_o$) until the error rate is low enough. As seen from FIG. 3, decreasing the transmission rate by a factor of two on the Jupiter/Saturn channel will reduce the average bit error rate from $5 \times 10^{-3}$ to about $10^{-6}$, and this is only under assumed ideal conditions ($\alpha = \infty$). However, during a close planetary encounter general science and engineering data must "share" the channel with imaging data. Imaging experiments are typically allocated between 80 and 90 percent of the total transmission capability during such encounters. Reducing the transmission rate by a factor of two to obtain very low error rate is clearly unacceptable for uncompressed PCM imaging experiments, since they only require bit error rates in the vicinity of $5 \times 10^{-3}$. The presently proposed solution to this problem for the Jupiter/Saturn Mariner missions is to put additional error protection on the general science and engineering data using a modified Golay block code.

However, from the foregoing discussion and the performance curve of the concatenated RS-Viterbi channel shown in FIG. 3, it should be apparent that the concatenated RS-Viterbi channel is ideally suited to the general requirements of science and engineering data. This is the case since with the concatenated RS-Viterbi channel very low error rates, needed to transmit general science and engineering data, are attainable without a substantial increase of $E_b/N_o$. With $J=8$ and $E=16$ all data can be transmitted through the system at an overall $E_b/N_o$ of 2.6 or 2.7 db with negligible degradation due to errors. It should also be noted that it is possible to apply data compression to general science and engineering data without worrying about a disastrous effect from errors. Clearly, as seen from FIG. 3, by a very small increase in $E_b/N_o$ on the order of about 0.2 db the system can operate with a codeword error probability of $10^{-6}$ which would satisfy all science and engineering data and be more than enough for the imaging data.

Figure 10:
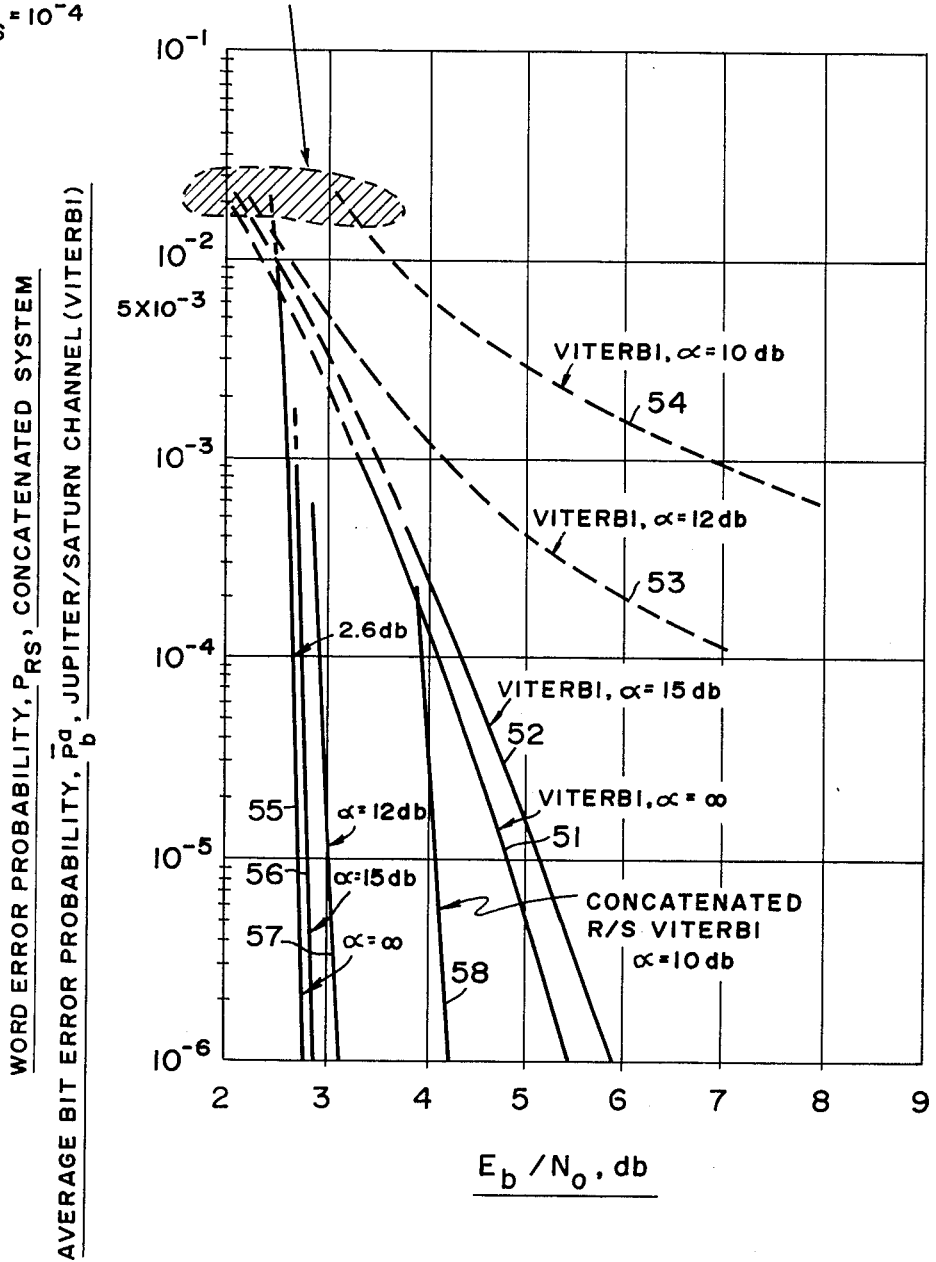
FIG. 10 is a diagram of performance curves of a Viterbi channel and the concatenated RS-Viterbi channel under ideal and non-ideal conditions.

As previously pointed out, the performance curves shown in FIG. 3 are for assumed ideal conditions in which carrier phase is exactly known, i.e., $\alpha = \infty$. However, under actual operating conditions, a phase locked loop, tracking a noisy received signal, will generally provide a phase reference for the demodulator which is imperfect, i.e., $\alpha \neq \infty$. This causes a degradation in system performance. The effect of decreasing $\alpha$ on the Viterbi channel has been analyzed in reference B and is diagrammed therein on page 845, for $K=7$, $\nu=2$. Some of the curves from reference B are shown in FIG. 10 for the Viterbi channel for $\alpha = \infty$, $\alpha = 15db$, $\alpha = 12db$ and $\alpha = 10db$. These curves are designated by numerals 51–54, respectively. It has been appreciated and as seen from FIG. 10 in the Viterbi channel as $\alpha$ decreases to obtain a low bit error probability, higher and higher $E_b/N_o$ is required. For example, for a bit error probability of $10^{-4}$ a change in $\alpha$ from 15db to 12db requires a change from about $E_b/N_o$ of 4.4db to about 8db, which corresponds to a reduction in transmission rate by about a factor of 2.

The effect of decreasing $\alpha$ on the concatenated RS-Viterbi system has never been analyzed in the prior art. From a first impression it would seem that a similar effect would occur in the concatenated RS-Viterbi system. That is, at low codeword error probability on the order of $10^{-4}$ the needed $E_b/N_o$ would increase greatly from that required for $\alpha = \infty$ as $\alpha$ decreases, in a relationship proportional to that experienced in the Viterbi channel alone. That is, from a first impression one would assume that for a codeword error probability on the order of $10^{-4}$ as $\alpha$ changes from $\infty$ to lower values, e.g., 15db or 12db the required $E_b/N_o$ would increase by about 4db, which would reduce transmission rate by a large factor. It is reasonable to assume that based on such first impression the use of the concatenated RS-Viterbi system was never considered by others for the transmission of compressed data. However, a careful analysis shows that this is not the case. That is, the analysis shows that in the concatenated RS-Viterbi channel the increase in $E_b/N_o$ due to a reduction in $\alpha$ from $\infty$ to reasonable values is quite small for codeword error probabilities of interest.

With a conventional code of K=7, $\nu$=2 in order to obtain a codeword error probability $P_{RS} = 10^{-4}$ the Viterbi decoder operates in the region where its average bit error probability $\overline{P_b}$ is on the order of 1/50. In this region of operation the change in required system's $E_b/N_o$ is very small due to changes of $\alpha$. For example the change in $E_b/N_o$ from $\alpha = \infty$ to $\alpha = $ 15db in the Viterbi channel at $\overline{P_b} \simeq 1/50$ is on the order of about 0.1db. It is by this amount that the performance curve for the concatenated RS-Viterbi system is shifted at $P_{RS} = 10^{-4}$ when $\alpha$ changes from $\infty$ to 15db. In FIG. 10 the performance curves of the concatenated system for different values of $\alpha$ are designated by lines 55–58. In the operating region of the Viterbi decoder ($\overline{P_b} \simeq 1/50$) fo a change of $\alpha$ from $\infty$ to 10db the $E_b/N_o$ difference is about 1.2db. Thus, for the concatenated RS-Viterbi system at $P_{RS} = 10^{-4}$ the shift would be from 2.6db to 3.8db. However, for a change in $\alpha$ from $\infty$ to 12db in the concatenated RS-Viterbi system for $P_{RS} = 10^{-4}$ the increase in $E_b/N_o$ is only about 0.3 (from 2.6db to about 2.9db).

For these curves the points for $P_{RS} = 10^{-4}$ for different values of $\alpha$ were calculated based on the shift in the Viterbi curves in the approximate operating region of about 1/50 for the Viterbi decoder bit error rate $\overline{P_b}$, needed to produce a codeword error probability of $10^{-4}$. The rest of the curves 55–58 were interpolated. As seen from FIG. 10 the Viterbi curves are practically parallel from about $\overline{P_b}$ of $8 \times 10^{-3}$ and up. Thus, the curves 55–58 are reasonably accurate down to at least a codeword error probability of $P_{RS} = 10^{-6}$.

It should be pointed out that at much lower codeword error probabilities for which the Viterbi decoder operating region is at a bit error probability $\overline{P_b}$, where the Viterbi curves ae no longer parallel, e.g., $\overline{P_b} = 10^{-3}$, the performance curves for the concatenated RS-Viterbi systems would also tend to fan out and would no longer be parallel. However, such low codeword error probabilities are not required for the transmission of compressed data, either image data or data derived from general engineering or scientific experiments. Thus, in the regions of interest for the present invention the performance curves of the concatenated RS-Viterbi system are reasonably assumed to be parallel as shown in FIG. 10. more importantly, it is seen that at the region of interest, namely $P_{RS} = 10^{-4}$, the difference in required $E_b/N_o$ from ideal conditions ($\alpha = \infty$) to non-ideal conditions, such as $\alpha = $ 12db is very small, e.g., 0.3db. Furthermore, it is seen that the performance curves are quite steep and therefore a change in $P_{RS}$ by an order of magnitude requires a minimal change on the order of 0.1db in $E_b/N_o$.

Hereinbefore $P_{RS} = 10^{-4}$ was assumed as the value of RS codeword error probability below which the effect of lost source blocks can be considered negligible. Clearly, if $P_{RS} = 10^{-5}$ were chosen the increase in the required $E_b/N_o$ would be about 0.1db from 2.6db to 2.7db for the ideal case ($\alpha = \infty$) or from about 2.9db to about 3db for $\alpha = $ 12db. Recalling the foregoing equations and Table 2, with $P_{RS} = 10^{-5}$ with a source block rate of 4.0 bits/pixel only 1 out of every 170 pictures would have any degradation due to the channel.

From the foregoing it is thus seen that since the performance curves of the concatenated RS-Viterbi system are steep and parallel even down to very low ($10^{-6}$) codeword error probabilities, the RS-Viterbi system is particularly suited to transmit compressed imaging data at $E_b/N_o$ values (2.6 – 3.0db) which are on the order of the $E_b/N_o$ required for transmitting non-compressed image data with a bit error probability $\overline{P_b}$ on the order of $5 \times 10^{-3}$. Furthermore, the concatenated RS-Viterbi system can be used to transmit scientific and engineering data at sufficiently low error probabilities without requiring additional coding, such as that provided by the Golay coder, as hereinbefore discussed. In addition, it should be stressed that if desired, the system can be used to code and transmit non-compressed data.

Hereinbefore the concatenated RS-Viterbi system has been described in connection with J=8, E=16, and K=7, $\nu$=2. It should be appreciated that other code parameters can be employed. As is known J defines the number of bits per RS symbol. Since the memory of any modern minicomputer is structured in powers of two, with a byte size of eight-bits the most common, the choice of J=8 seems to be a preferred one for decoding applications. An RS code of J=8, E=8 may offer certain advantages over J=8, E=16. The equation for computation load per codeword is dominated by an $E^2$ term. Thus, by reducing E from 16 to 8 higher decoding rates can be achieved. As to the convolutional code, it was described in terms of K=7 and $\nu$=2 since this code is expected to be implemented in the Jupiter/Saturn channel for the future Jupiter/Saturn exploration missions. However, the invention is not intended to be limited thereto. Other convolutional codes may be used such as K=7, $\nu$=3 which offers an improvement between 0.3 and 0.5db over the K=7, $\nu$=2 code, with improvements largest at higher values of $\overline{P_b}$. Conceivably both codes can be onboard the spacecraft in encoder 16 (see FIG. 1). When code K=7, $\nu$=3 is used in the concatenated RS-Viterbi system one can expect an improvement of about 0.4 to 0.5db of $E_b/N_o$ at $P_{RS} = 10^{-4}$.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a communication system for communicating data from a first station to a second station, the arrangement comprising:
   Reed Solomon coding and interleaving means in a first station adapted to receive data and code it into I interleaved Reed Solomon codewords, each codeword containing $2^J - (1 + 2E)$ Reed Solomon information symbols and 2E parity symbols, each symbol being J bits long, I, J and E being integers;
   convolutional encoding means in said first station and characterized by a constraint length definable as K and a code rate definable as $1/\nu$, for encoding the coded output of said Reed Solomon coding and interleaving means;

transmitter means in said first station for transmitting the output of said convolutional encoding means to a second station;

receiver means at said second station for receiving signals transmitted by said transmitter means;

Viterbi decoding means at said second station, responsive to the output of said receiver means for decoding the receiver means output to provide an output which is related to the output of said Reed Solomon coding and interleaving means supplied in said spacecraft to said convolutional encoding means;

Reed Solomon decoding and deinterleaving means at said second station responsive to the output of said Viterbi decoding means for deinterleaving said I Reed Solomon codewords and for decoding said codewords to provide an output substantially corresponding to the data adapted to be supplied in said first station to said Reed Solomon coding and interleaving means, said J, E, I, K and $\nu$ being selected to provide a Reed Solomon codeword error probability, definable as $P_{RS}$, which is not greater than a preselected value for a preselected system signal-to-noise ratio, definable as $E_b/N_o$ in db;

data means in said first station for gathering data and for providing an output representing said data as a stream of bits;

data compression means in said first station for compressing the data-representing stream of bits from said data means into a stream of bits representing blocks of data, definable as source blocks, the average number of bits representing each source block being less than the number of bits provided by said data means for the corresponding source block;

means in said first station for supplying the bits representing said source blocks from said data compression means to said Reed Solomon decoding and interleaving means; and data de-compression means at said second station responsive to the output of said Reed Solomon decoding and interleaving means for providing output data which is an approximation of the data supplied to said data compression means prior to it being compressed therein.

2. The arrangement as described in claim 1 wherein $P_{RS}$ is not greater than $10^{-4}$ when $E_b/N_o$ is in the range between 2 and 3db.

3. The arrangement as described in claim 1 wherein $J=8$, $E=16$, $K=7$ and $\nu=3$.

4. The arrangement as described in claim 1 wherein $J=8$, $E=8$, $K=7$ and $\nu=3$.

5. The arrangement as described in claim 1 wherein $J=8$, $E=16$, $K=7$, $\nu=2$ and I is less than 16 but not less than 8.

6. The arrangement as described in claim 1 wherein $J=8$, $E=16$, $K=7$ and $\nu=2$.

7. The arrangement as described in claim 6 wherein $I=16$.

8. A method of communicating data from a spacecraft to a data processing center on Earth, the steps comprising:

gathering data in a spacecraft;

compressing the gathered data in said spacecraft;

coding the compressed data in said spacecraft in a concatenated Reed Solomon-Viterbi coding channel, comprising a Reed Solomon coder and interleaver followed by a Viterbi convolutional encoder;

transmitting to Earth the data coded by said concatenated Reed Solomon-Viterbi coding channel;

receiving on Earth the coded data transmitted from said spacecraft; and decoding the received coded data, first by a Viterbi decoder followed by a Reed Solomon decoder and deinterleaver, the parameters E, J and I of the Reed Solomon portion of the coding channel and the parameters K and $\nu$ of the Viterbi portion of said channel being selected to provide a Reed Solomon codeword average error probability definable as $P_{RS}$ being not greater than $10^{-4}$ with a system's signal-to-noise ratio, definable as $E_b/N_o$, being between 2 and 3db, J representing the number of bits per Reed Solomon symbol, E representing one-half the number of Reed Solomon parity symbols, I representing the number of interleaved Reed Solomon codewords, and where K represents the constraint length of the Viterbi encoder and $1/\nu$ is the code rate.

9. The method as described in claim 8 wherein said data is imaging data representing a two dimensional array of $x$ by $x$ picture elements, definable as pixels, each pixel in said first stream of bits being represented by $y$ bits, said pixels being separable into source blocks, each source block comprising an array of $z$ by $z$ pixels whereby $m = y(z^2)$, where $m$ is an integer, representing the number of bits per source blocks;

said entire array of $x$ by $x$ pixels being divisible into $x^2/z^2$ source blocks, the $m$ bits representing each source block being compressed so that the average number of bits representing each source block in said second stream of bits is less than $m$.

10. The method as described in claim 8 wherein the parameters of the Reed Solomon coding and interleaving means are $J=8$, $E=16$, $I=16$ and wherein the parameters of the Viterbi portions of said channels are $K=7$ and $\nu=2$.

* * * * *